(12) United States Patent
Im et al.

(10) Patent No.: US 9,189,383 B2
(45) Date of Patent: Nov. 17, 2015

(54) NONVOLATILE MEMORY SYSTEM AND DATA PROCESSING METHOD

(75) Inventors: Kwangseok Im, Seoul (KR); Bumseok Yu, Suwon-si (KR); Yeon Ju Jeong, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 497 days.

(21) Appl. No.: 12/558,632

(22) Filed: Sep. 14, 2009

(65) Prior Publication Data
US 2010/0088463 A1    Apr. 8, 2010

(30) Foreign Application Priority Data

Oct. 2, 2008    (KR) .......................... 10-2008-0097200

(51) Int. Cl.
*G06F 12/00* (2006.01)
*G06F 12/02* (2006.01)
*G06F 12/08* (2006.01)

(52) U.S. Cl.
CPC ........ *G06F 12/0246* (2013.01); *G06F 12/0804* (2013.01); *G06F 2212/7203* (2013.01)

(58) Field of Classification Search
CPC ................ G06F 2212/2022; G06F 2212/7203; G06F 12/0246; G06F 12/0804
USPC .......................................................... 711/103
See application file for complete search history.

(56) References Cited

U.S. PATENT DOCUMENTS

| | | | | |
|---|---|---|---|---|
| 4,131,940 A | * | 12/1978 | Moyer | 710/74 |
| 5,603,001 A | * | 2/1997 | Sukegawa et al. | 711/103 |
| 5,742,789 A | * | 4/1998 | Ofer et al. | 711/111 |
| 6,442,647 B1 | * | 8/2002 | Morton et al. | 711/112 |
| 6,754,765 B1 | * | 6/2004 | Chang et al. | 711/103 |
| 2002/0178330 A1 | * | 11/2002 | Schlowsky-Fischer et al. | 711/133 |
| 2004/0162926 A1 | | 8/2004 | Levy | |
| 2006/0152981 A1 | | 7/2006 | Ryu | |
| 2008/0016267 A1 | * | 1/2008 | Oyaizu | 711/103 |

FOREIGN PATENT DOCUMENTS

| | | |
|---|---|---|
| JP | 2006195990 A | 7/2006 |
| JP | 2007317047 A | 12/2007 |
| KR | 1020060081928 A | 7/2006 |

* cited by examiner

*Primary Examiner* — Larry Mackall
(74) *Attorney, Agent, or Firm* — Volentine & Whitt, PLLC

(57) ABSTRACT

A solid-state disk device exchanging data with a host includes a nonvolatile memory device, a buffer memory configured to temporarily store data exchanged between the host and the nonvolatile memory, and a buffer manager configured to control transfer of data to/from the buffer memory, wherein the transfer of data between the nonvolatile memory device and the host during a streaming mode of operation begins immediately when a defined unit data is input to the buffer memory.

20 Claims, 13 Drawing Sheets

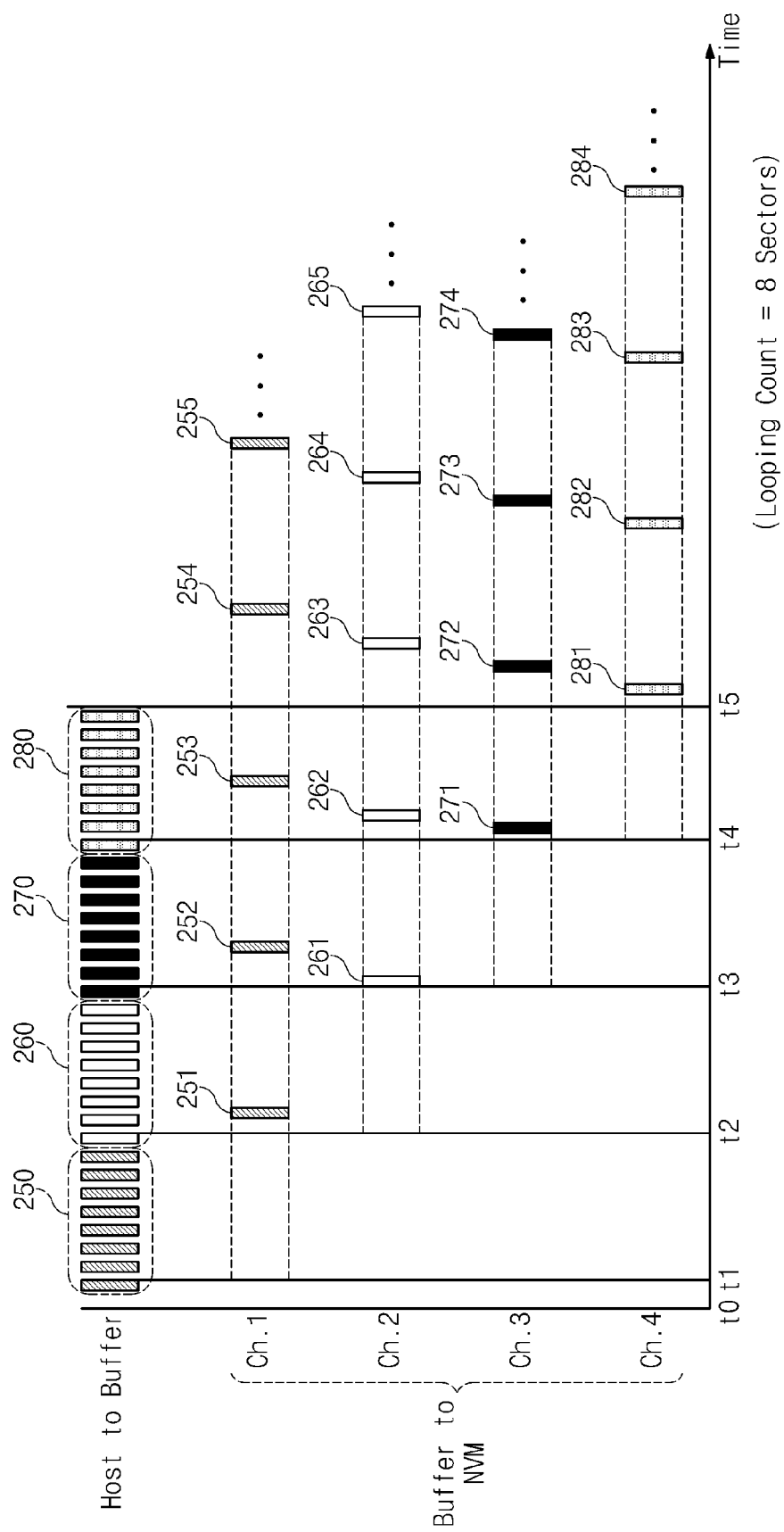

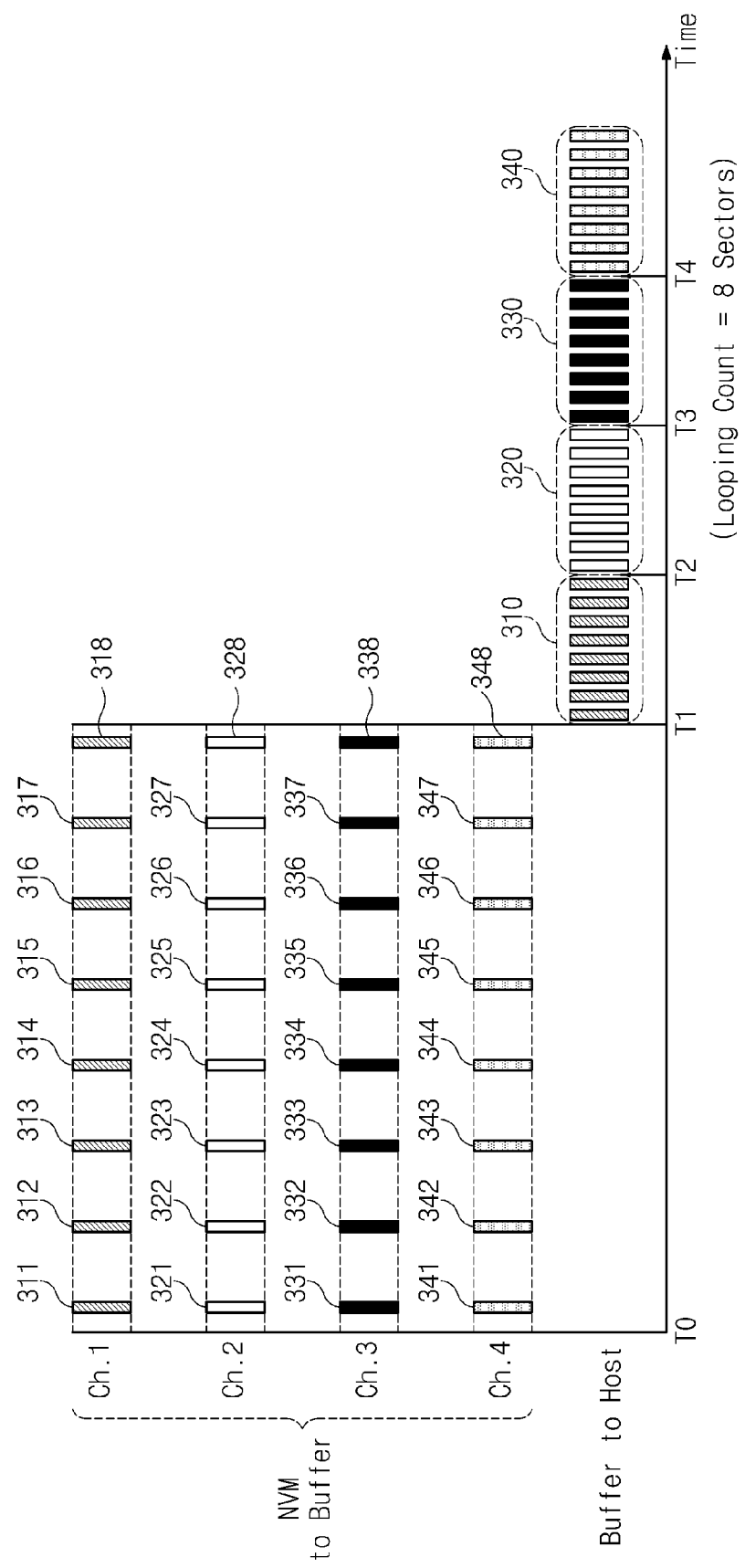

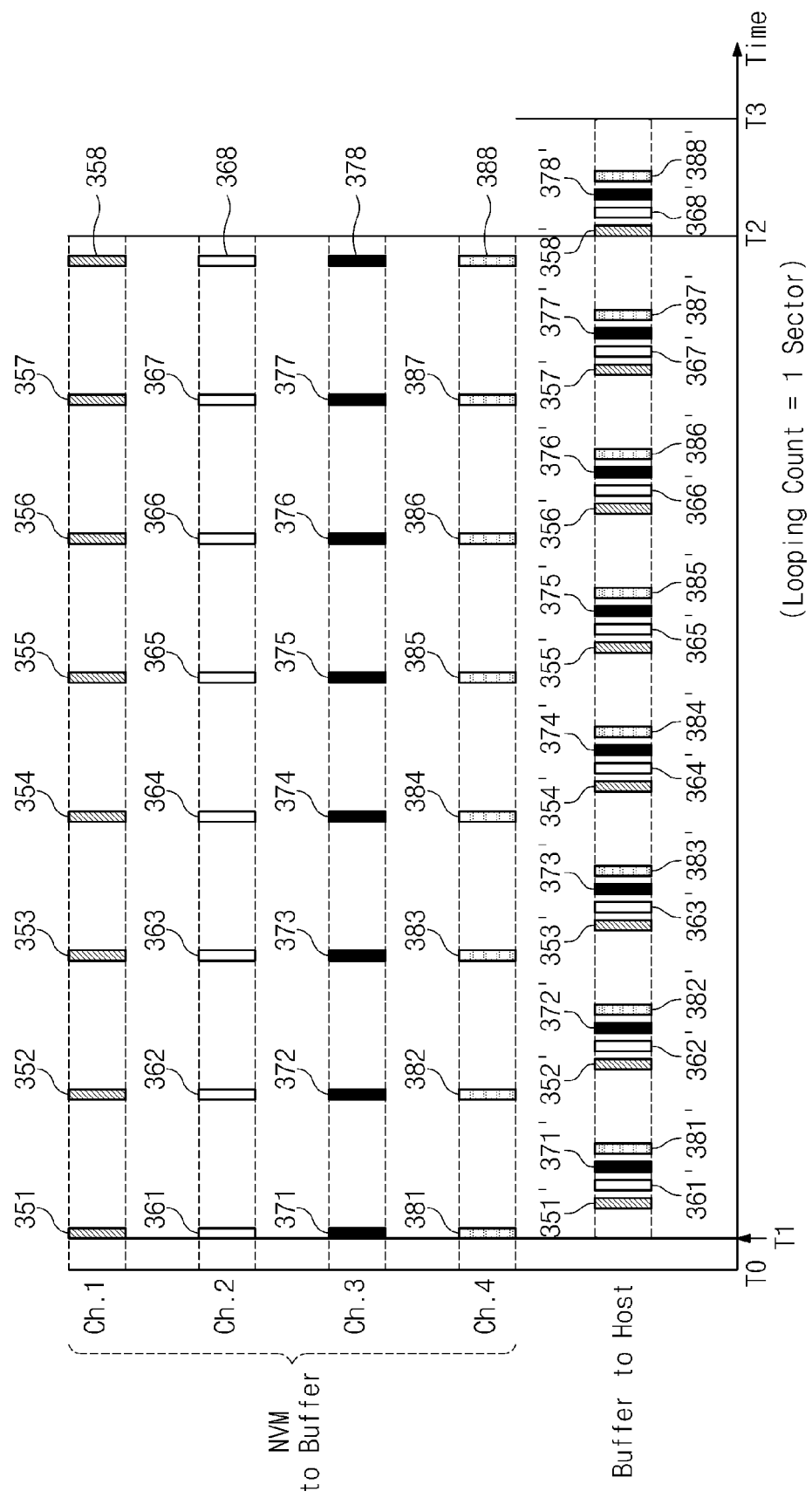

NONVOLATILE MEMORY SYSTEM AND DATA PROCESSING METHOD

CROSS-REFERENCE TO RELATED APPLICATION

This U.S. non-provisional patent application claims priority under 35 U.S.C. §119 to Korean Patent Application No. 10-2008-0097200 filed on Oct. 2, 2008, the subject matter of which is hereby incorporated by reference.

BACKGROUND

The present invention relates to nonvolatile memory systems. More particularly, the present invention relates to a semiconductor disk device incorporating a nonvolatile memory system as a storage medium and a related data processing method.

Flash memory is a form of electrically erasable nonvolatile memory that has gained wide acceptance in such applications as computers, memory cards, etc. Flash memory is also used in portable information devices such as cellular phones, PDAs, and digital cameras. Flash memory is also being used as a replacement for, or in conjunction with, bulk data storage devices, such as hard disk drives (HDDs).

Emerging portable information devices require large amounts of data storage capacity in order to provide high-end data processing functionality (e.g., video playback). Many different approaches have been proposed over the years to meet this requirement. For example, memory devices incorporating multi-bit memory cells have been actively developed. A multi-bit memory device includes memory cells capable of storing 2 or more bits of data per memory cell. A memory cell adapted to store multi-bit data is commonly referred to as a Multi-Level Cell (MLC). In contrast, a memory cell adapted to store 1-bit data is commonly referred to as a Single-Level Cell (SLC). Flash memory devices incorporating an array of MLCs enjoy increased data storage capacity over similarly sized memory arrays of SLCs. However, the process of writing data to a memory cell array of MLCs takes considerably longer than SLC memory arrays.

Given this MLC/SLC tradeoff between data storage capacity and write operation speed, many contemporary flash memory devices are hybrid type devices including some SLCs operating at a higher speed and some MLCs providing expanded data storage capacity. In particular, hybrid NAND flash memory has been introduced with notable advances in performance. The hybrid NAND flash memory can selectively use either MLCs or SLCs to store data. In addition, recent technical advances allow both high speed operation and high data storage capacity by mounting a SLC memory chip and a MLC memory chip in a single integrated circuit package. Such improved device integration and packaging techniques improve overall performances while reducing cost.

Such improvements allow the cost effective manufacture of products including both high-cost nonvolatile memory operating at relatively low write speeds and low-cost nonvolatile memory operating at relatively high write speeds. In such products, the overall performance of the data storage device depends on the "write management" of data between these two different types of memory cells. That is, the high-speed SLC memory is commonly used to store frequently and randomly accessed data in relatively small data blocks (i.e., so-called "hot data"). This approach speeds overall data access performance and limits the number of erase operations applied to the low speed MLC memory during repeated write operations.

Thus, as compared with other forms of memory, flash memory enables high-speed data access at relatively low cost. However, an erase operation must typically be performed prior to a write operation in flash memory. Further, the unit size of data to be erased is usually larger than that of data to be written. These technical considerations make it difficult to use the flash memory as a main memory and directly use a common hard-disk file system even when the flash memory is used as an auxiliary storage device. Therefore, a flash translation layer (hereinafter referred to as "FTL") is used between the file system and the flash memory to conceal erase operations applied to the flash memory.

The FTL essentially maps a logic address generated by the file system onto a physical address within the flash memory performing an erase operation during the write operation. A variety of FTL schemes have been conventionally proposed. One type of FTL scheme is the so-called log block mapping scheme. The log block mapping scheme uses a limited number of log blocks as a write buffer. Given the foregoing address mapping function for the FTL, a host device may recognize the flash memory device as a hard disk drive (or SRAM) and access the flash memory device in a manner similar to a hard disk drive.

As the price of flash memory has dropped over time, it has been increasingly used as a bulk data storage medium replacing conventional hard disk storage devices. Such flash memory based, bulk data storage devices are commonly referred to as solid-state drives or solid-state disks (hereinafter denoted as "SSD"). According to typical data access operations within a SSD, data may be written to or retrieved from memory at high speed without the search time and failure rate typical of HDDs which require the operation of various electro-mechanical components. Further, SSDs are not easily damaged even by external impact and its operation is characterized by low heat and low noise generation, and reduced power consumption. Moreover, it is possible to make SSDs light and compact. Therefore, the demand for SSDs is increasing with trends towards higher performance portable information devices requiring large data storage capacity. Accordingly, there have been extensive studies on SSDs and their ability to provide high speed data access with high reliability.

SUMMARY

Embodiments of the invention provide a semiconductor disk device adapted to exchange data with a host device.

In one embodiment, the invention provides a solid-state disk device exchanging data with a host and including a nonvolatile memory device, a buffer memory configured to temporarily store data exchanged between the host and the nonvolatile memory, and a buffer manager configured to control transfer of data to/from the buffer memory, wherein the transfer of data between the nonvolatile memory device and the host during a streaming mode of operation begins immediately when a defined unit data is input to the buffer memory.

In another embodiment, the invention provides a data processing system, including a data storage device, and a host system exchanging data with the data storage device. The data storage device is the solid-state disk device and includes; a nonvolatile memory device, a buffer memory configured to temporarily store data exchanged between the host and the nonvolatile memory, and a buffer manager configured to control transfer of data to/from the buffer memory, wherein the transfer of data between the nonvolatile memory device and the host during a streaming mode of operation begins immediately when a defined unit data is input to the buffer memory.

BRIEF DESCRIPTION OF THE DRAWINGS

FIG. 5B is a timing diagram illustrating one write transaction performed during a streaming mode.

FIG. 7A is a timing diagram illustrating a read transaction performed during a non-streaming mode.

FIG. 7C is a timing diagram illustrating another read transaction performed during the streaming mode.

DESCRIPTION OF EMBODIMENTS

It should be understood that both the foregoing description and the following detailed description are illustrative and additionally describe certain embodiments of the invention. Throughout the written description and drawings, like reference numbers and labels are used to indicate like or similar elements.

Within the context of the following exemplary embodiments, a "semiconductor disk device" (e.g., a SSD) may hereinafter be employed as one example of a nonvolatile memory system. Furthermore, although features of certain embodiments of the invention are described with an assumption that a movable data unit is a sector unit, the data unit is not limited to only the sector unit. Advantages and features of the present invention and methods of accomplishing the same may be understood more readily with reference to the following detailed description of preferred embodiments and the accompanying drawings by those skilled in the art. In addition, NAND flash memory is described as an example of a storage medium, but other nonvolatile memory devices may be configured as the storage medium. For example, PRAM, MRAM, ReRAM, FRAM, and NOR flash memory may be used as a storage medium and may be applied to a memory system using different kinds of memory devices together with each other.

The present invention may be embodied and applied through other embodiments. Moreover, the detailed description may be modified and changed according to viewpoints and applications without departing from the scope and spirit of the present invention and another purpose. Exemplary embodiments of the present invention will now be described in detail with reference to the accompanying drawings.

Figure 1:
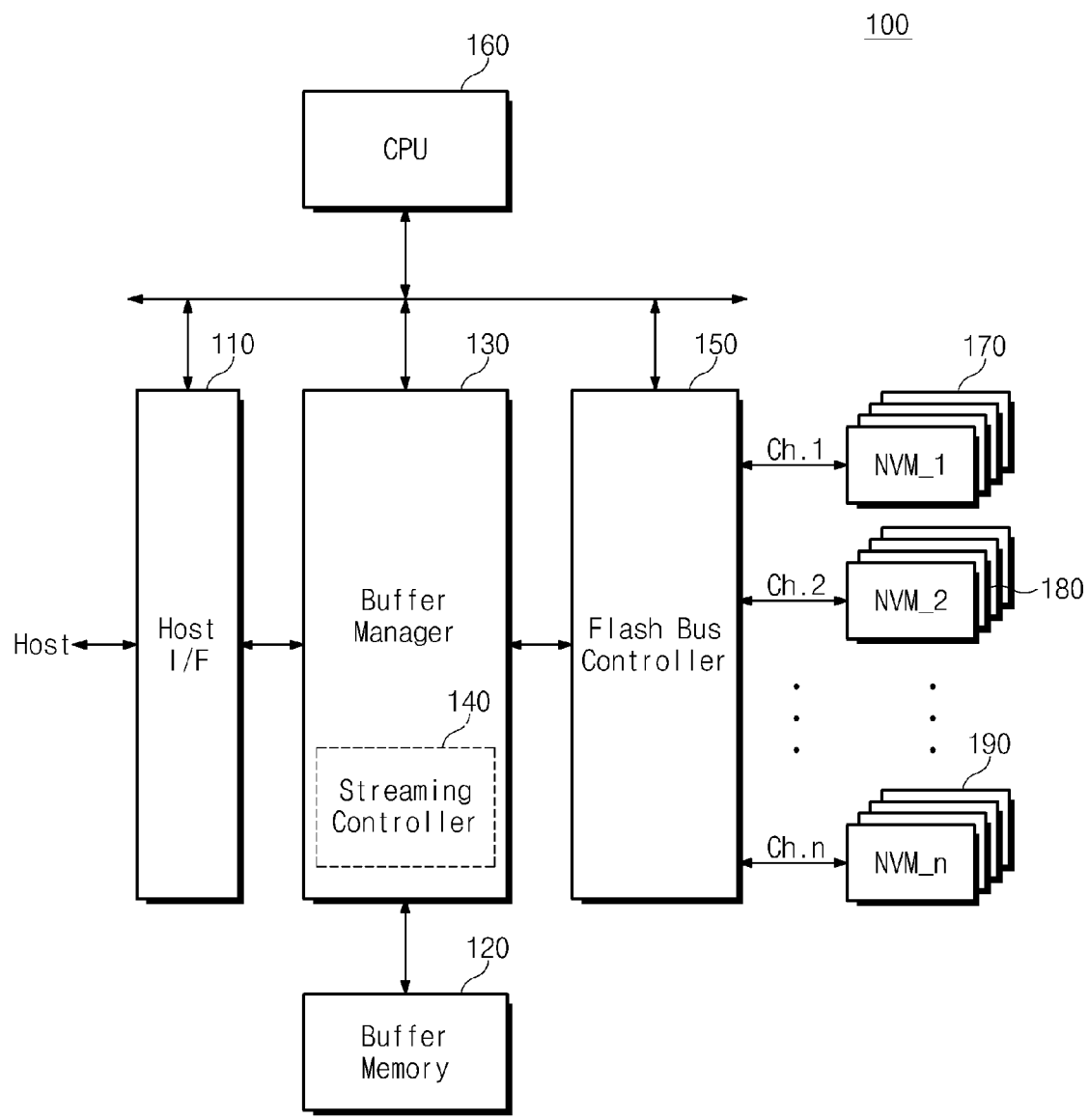
FIG. 1 is a block diagram illustrating one configuration for a semiconductor disk device according to an embodiment of the invention.

FIG. 1 is a block diagram illustrating one embodiment of the invention. With reference to FIG. 1, a semiconductor disk device 100 exchanges data with a host through conventionally configured input/output (I/O) ports. The semiconductor disk device 100 includes a plurality of nonvolatile memories 170, 180, and 190 collectively forming a data storage medium. The plurality of nonvolatile memories 170, 180, and 190 are electrically connected to a flash bus controller 150 via a plurality data channels (Ch.1-Ch.n). The nonvolatile memories 170, 180 and 190 may be variously connected to the channels and may be similar or different in type and function.

For example, the nonvolatile memories connected to a particular channel may be single-level flash memory, multi-level flash memory, or OneNAND flash memory. That is, single-level cell (SLC) flash memories may be connected to one channel, multi-level cell (MLC) flash memories may be connected to another channel, and OneNAND flash memories may be connected to the yet another channel. The configuration of the semiconductor disk device 100 will now be described in some additional detail.

A host interface 110 enables a host to be physically connected to the semiconductor disk device 100. That is, the host interface 110 provides an interfacing with the semiconductor disk device 100 according to a bus format of the host. The bus format of the host may be configured by USB (Universal Serial Bus), PCI express, ATA, PATA (Parallel ATA), SATA (Serial ATA), and so on. Generally, a corresponding data transmission rate (for example, STAT) assuming the above-described bus format for the host will typically be much higher than that of a memory channel within the semiconductor disk device 100. In order to compensate this difference in data transmission rate, a buffer memory 120 is provided. Furthermore, the host interface 110 supports a disk emulation function for supporting such that the host recognizes the semiconductor disk device 100 as a hard disk driver (HDD). For example, the host interface 110 provides the function of flash translation layer (FTL) that conceals the erase operation.

The buffer memory 120 temporarily stores "write data" received from the host and to be written to memory or "read data" retrieved from memory. As noted above, when data transmission speed for the host is much greater than the memory system, the buffer memory 120 is provided to prevent performance degradation due to this mismatch. However, it will be apparent to those skilled in the art that the buffer memory 120 is not limited to this disclosure.

A buffer manager 130 controls read and write operation between the buffer memory 120 and the host. For example, the buffer manager 130 temporarily stores write data received via the host interface 110 before being transferred to the buffer memory 120. The write data stored in the buffer memory 120 is subsequently programmed to the nonvolatile memory according to a prescribed data unit under the control of the buffer manager 130. Conversely, read data retrieved from at least one of the nonvolatile memories 170, 180, and 190 is temporarily stored in the buffer memory 120 under the control of the buffer manager 130. The temporarily stored read data is then transferred to the host via host interface 110.

In the illustrated embodiment, the buffer manager 130 includes a streaming controller 140 configured to temporarily store write data and read data in the buffer memory 120 and transmit such data using a so-called "streaming process". In a semiconductor disk device 100 adopting a SATA interfaces, for example, a data exchange rate from the host is much higher than the internal data exchange rate within the semiconductor disk device 100. Accordingly, the buffer manager 130 should deliver write data cached in the buffer memory 120 to the nonvolatile memories 170, 180, and 190 as fast as possible in order to store the write data at the highest possible speed. This overall data control function is referred to as "streaming". For example, if only one sector is stored from the host or the nonvolatile memories 170, 180, and 190, the streaming controller 140 automatically recognizes the sector to deliver the stored sector into the host or the nonvolatile memories 170, 180, and 190. Therefore, as compared to the mode for starting to transmit the data cached in the buffer memory 120 when one page is fulfilled in each channel, the streaming mode may significantly increase the transmission rate.

The flash bus controller 150 controls the exchange of data with the nonvolatile memories 170, 180, and 190. The flash bus controller 150 may be configured to support various forms of nonvolatile memory. Further, the flash bus controller 150 may be configured to perform data scattering for write data received from the buffer memory 120 using the variously available data channels. The flash bus controller 150 is also configured to collect read data from the nonvolatile memories 170, 180, and 190 provided via the channels. Then, the collected read data is transferred to the buffer memory 120. The flash bus controller 150 may also be configured to deliver instructions to the nonvolatile memories via corresponding channels under the control of a processing unit (CPU) 160.

The processing unit 160 may generate an arbitrary instruction using values of certain control registers (not shown) within the host and the flash controller 150. Moreover, the processing unit 160 delivers various control information required for the write and read operations. For example, when write and read operation are indicated from an external source (e.g., the host), certain write and read instructions may be stored in a register (not shown) within the host interface 110. The host interface 110 informs the processing unit 160 that the write and read instruction has been received. Such operations may also be conducted between the processing unit 160 and the flash bus controller 150. The processing unit 160 controls each of the components according to firmware for driving the semiconductor disk device 100. However, since the streaming operation is directly conducted at the buffer manager 130 in a hardware manner without intervention of the firmware, a burden on the processing unit 160 does not increase.

Each of the nonvolatile memories 170, 180, 190 exchanges data with the buffer memory 120 through the flash bus controller 150 and the buffer manager 130.

According to certain embodiments of the invention, the data stored in the buffer memory 120 may be quickly delivered into a target memory device or the host under the control of the streaming controller 140. Therefore, before configuring a page unit, the data cached to the buffer memory 120 may be transmitted to increase the performance of the read or write transaction.

Figure 2:
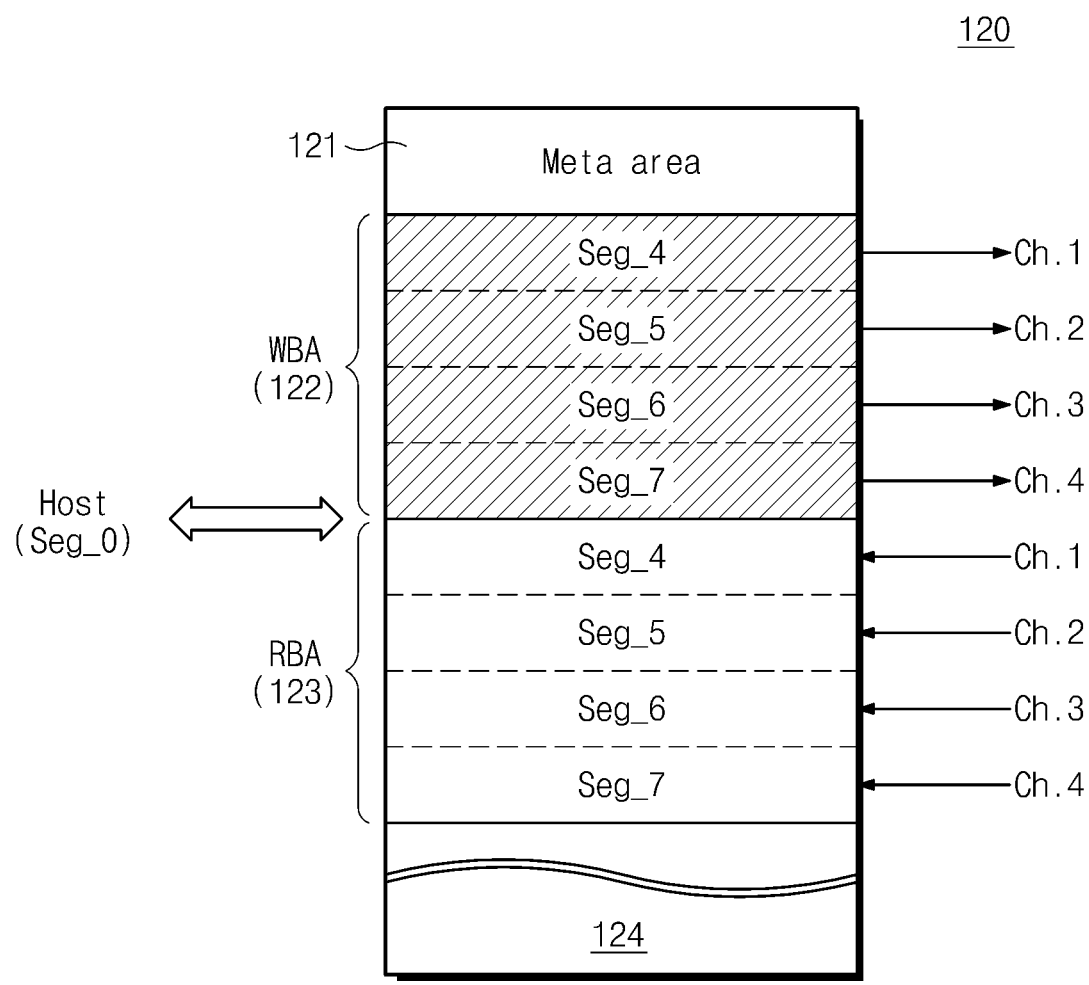
FIG. 2 is a conceptual memory map illustrating area allocation of the buffer memory shown in FIG. 1.

FIG. 2 is a memory map illustrating one possible configuration of memory areas for the buffer memory 120 shown in FIG. 1. Referring to FIG. 2, the buffer memory 120 includes a metadata area 121, a write buffer area 122, and a read buffer area 123. The remaining area 124 represents memory outside of the metadata area 121, write buffer area 122, and the read buffer area 123.

Security and control information associated with data access operations within the memory system may be stored in the metadata area 121. The write buffer area (WBA) 122 is a buffer area in which write data transmitted from a host is stored. The WBA 122 is divided into a plurality of segments each corresponding to each of the channels. The write data to be stored in a designated channel is stored in the respective segments. For example, a plurality of sectors temporarily stored in a segment 4 (Seg_4) are transmitted to the nonvolatile memories included in a first channel Ch.1. A plurality of sectors temporarily stored in a segment 5 (Seg_5) are transmitted to the nonvolatile memories included in a second channel Ch.2. When the plurality of segments each corresponding to each of the channels is empty, the data are not transmitted to the channels. However, when any one of the sectors is input to the segments of the WBA 122, the input sector is immediately transmitted to the nonvolatile memories by the streaming controller 140.

A read buffer area (RBA) 123 is a buffer area in which the read data read from the nonvolatile memories is stored. Similar to the WBA 122, the RBA 123 is divided into a plurality of segments each corresponding to each of the channels. The read data are input from the designated channel, and the input read data are stored in each of the segments. When any one of the sectors is input to the segments of the RBA 123, the input sector data may immediately be transmitted to the host according to the control of the streaming controller 140.

Figure 3:
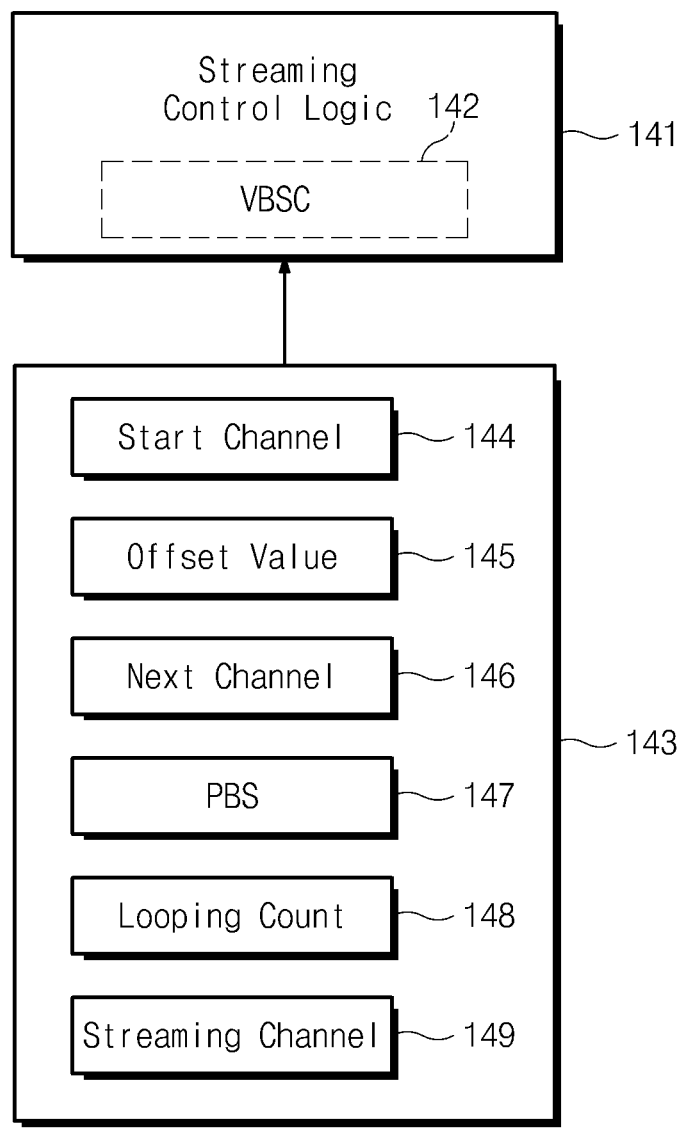
FIG. 3 is a block diagram further illustrating one configuration for the streaming controller shown in FIG. 1.

FIG. 3 is a block diagram further illustrating the streaming controller 140 shown in FIG. 1. Referring to FIG. 3, the streaming controller 140 includes a streaming control logic 141 and a register set 143. The streaming control logic 141 includes a valid buffer sector counter (VBSC) 142 to process the data stored in the buffer memory in a streaming manner.

The streaming control logic 141 controls the streaming of the data, which are temporarily stored in the WBA 122 and the RBA 123, with reference to the value of the VBSC 142. When the data are written from the host to the nonvolatile memory, the streaming control logic 141 performs a write streaming. During the write streaming, the streaming control logic 141 counts the number of sectors input to the segments of the WBA (122 in FIG. 2), which are allocated to each of the channels, as the value of VBSC. At the same time, the streaming control logic 141 counts down the number of sectors, which are transmitted from the segments to the nonvolatile memory, from the counted value of VBSC. The streaming control logic 141 activates buffering of data when the value of VBSC corresponding to the number of sectors stored in each of the segments is empty. On the other hand, the streaming control logic 141 transmits the data from the WBA 122 to the nonvolatile memory when the value of VBSC corresponding to any one of the segments (or channels) is sensed to be larger than 0. Accordingly, if each of the segments is not empty, the sectors stored in each of the segments are transmitted to the nonvolatile memory.

On the other hand, the streaming control logic 141 performs a read streaming to transmit the data from the nonvolatile memory to the host when data reading instructions are provided from the host. During the read streaming, the streaming control logic 141 counts the number of sectors input to the segments of the RBA 123 each corresponding to each of the channel, as the value of VBSC. At the same time, the streaming control logic 141 counts down the number of sectors, which are transmitted from the segments to the host, from the counted value of VBSC. If the value of VBSC corresponding to the number of sectors stored in each of the segments is empty, the streaming control logic 141 immediately activates the data transmission to the host. As described above, the streaming control logic 141 performs both the read streaming and the write streaming. However, the streaming control logic 141 may include elements for individually performing the read streaming and the write streaming.

The register set 143 includes registers 144, 145, ..., and 149 receiving operational parameters of the streaming control logic 141. A start channel register 144 sets a channel to which the streaming data is first transmitted during the streaming operation. An offset register 145 is configured to store an offset value that assigns a physical block address mapped based on an address LBA. It is necessary to provide the offset value corresponding to a start address according to setting of the channel in which the streaming is started during the streaming activation. A next channel register 146 is configured to set the sequence of the channels of the nonvolatile memory during the streaming operation. A page buffer size register 147 is configured to store the value of page size of each channel corresponding to the nonvolatile memory. A looping count register 148 is configured to define the number of sectors continuously transmitted to one channel. A streaming channel register 149 is configured to select the channel that is a target of the streaming operation. That is, the streaming channel register 149 is configured to select channels where data are read and written according to the streaming operation.

The streaming operation may be selectively activated or various streaming conditions may be set by inputting the values of the register set 143. This is because the streaming control logic 141 operates according to the value of registers input to the register set 143.

Figure 4:
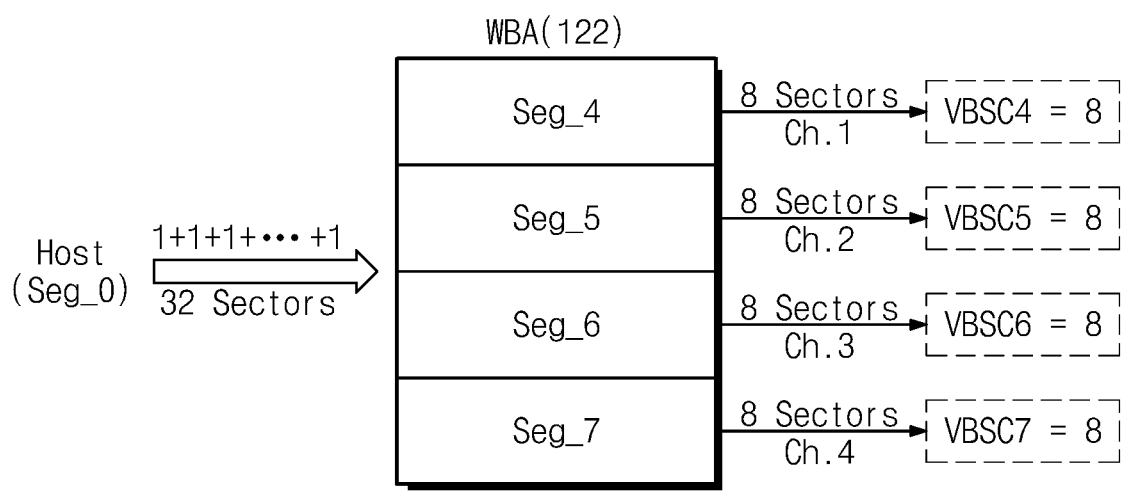
FIG. 4 is a block diagram further illustrating an operation updating the value of a valid buffer sector counter VBSC with respect to a write buffer area within an embodiment of the invention.

FIG. 4 is a block diagram illustrating an update operation for the VBSC 142 during a write streaming operation. More specifically, FIG. 4 illustrates operation of the VBSC 142 assuming thirty-two sectors and write data received from the host as continuously input. It is further assumed that the write data is not transferred from the buffer memory 120 to the nonvolatile memory in order to clearly explain the operation of the VBSC 142. However, in practical cases, the write data will be immediately transferred to the nonvolatile memory using a corresponding channel when even one sector is input to the relevant segment of the buffer memory 120. One example will now be described in some additional detail assuming a buffer segment size (hereinafter referred to as "BSS") of 8. The BSS defines the size of sectors stored in one segment.

Referring collectively to FIGS. 1 though 4, the buffer manager 130 stores the sector data input to the allocated segments of the WBA 122 in the buffer memory 120 as the host continuously inputs 32 sectors. Segment allocation of the WBA 122 will now be described. It is assumed that allocation of segments to sectors input from the host is set to a segment 0 (Seg_0). With respect to the data transmitted from the buffer memory to the nonvolatile memory, the buffer area allocated to a first channel Ch.1 is allocated as a segment 4 (Seg_4). Further, the buffer area allocated to the nonvolatile memories corresponding to a second channel Ch.2 is allocated as a segment 5 (Seg_5). With respect to the data to be transmitted from the buffer memory to the nonvolatile memory, the buffer area corresponding to a third channel Ch.3 is allocated as a segment 6 (Seg_6), and the buffer area corresponding to a fourth channel Ch.4 is allocated as a segment 7 (Seg_7). At this time, the values of VBSC of the segments in the WBA 122 are sequentially counted up, respectively, when thirty-two sectors are successively provided from the host. When the BSS reaches 8 with sequential increase of the value of valid buffer sector counter VBSC4 corresponding to the segment 4 (Seg_4), the input sectors are stored in the segment 5 (Seg_5). When the value of valid buffer sector counter VBSC5 corresponding to the segment 5 (Seg_5) reaches the BSS, the following sectors are stored in the segment 6 (Seg_6). When the value of valid buffer sector counter VBSC6 corresponding to the segment 6 (Seg_6) reaches the BSS, the following sectors are stored in the segment 7 (Seg_7). When the value of valid buffer sector counter VBSC7 corresponding to the segment 7 (Seg_7) reaches the BSS, the buffering and the count operation of the VBSC value are completed with respect to 32 sectors.

The above-mentioned count operation of the VBSC 142 has been described under an assumption that the data is not transmitted from the buffer memory to the nonvolatile memory. However, as noted above in practical cases, the data will be immediately transferred to the nonvolatile memory via an allocated channel when a value of VBSC corresponding to each of the segments is 1 or more.

Figure 5A:
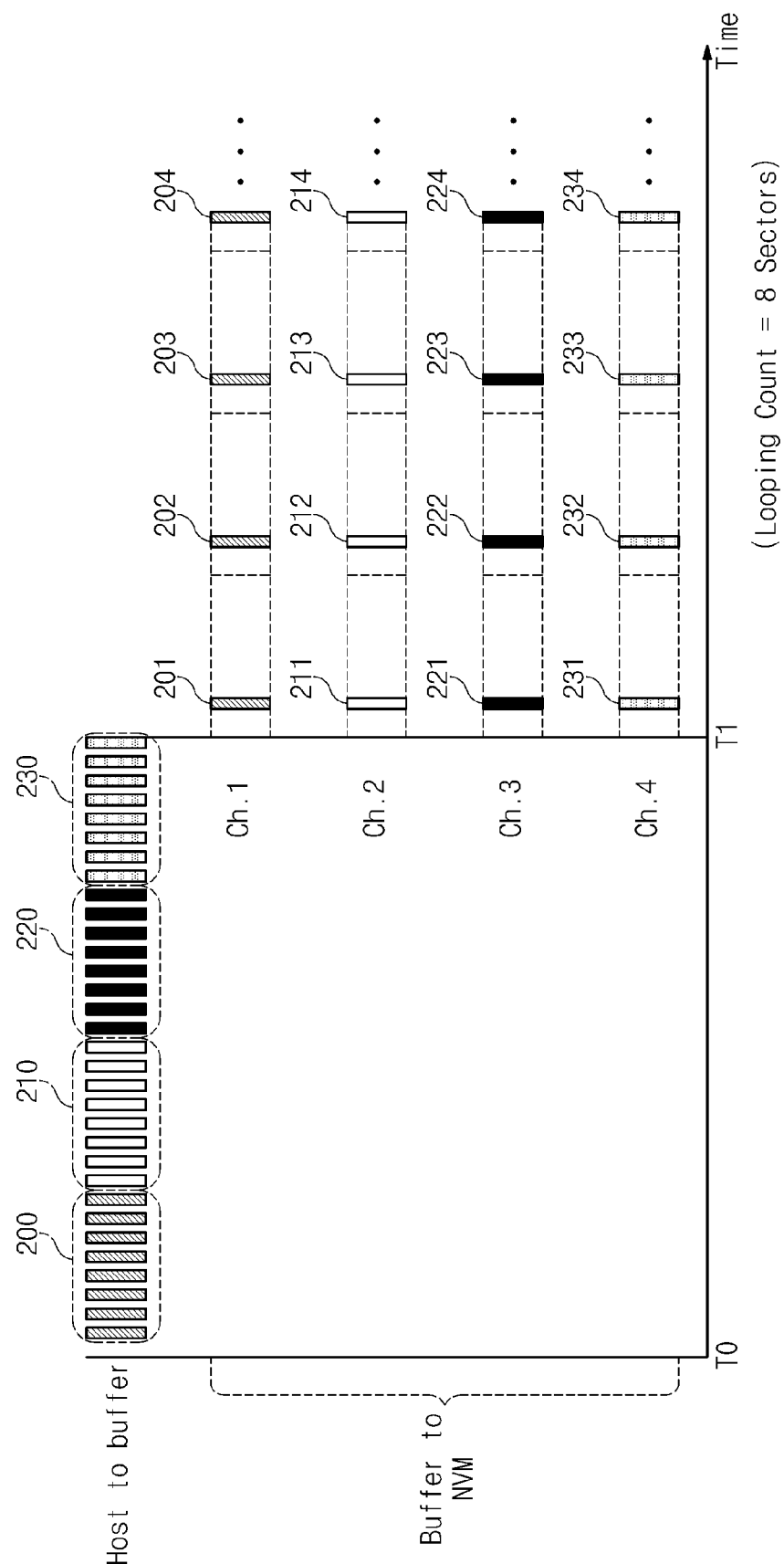
FIG. 5A is a timing diagram illustrating a write transaction performed during a non-streaming mode.

FIG. 5A is a timing diagram illustrating a write transaction performed during a non-streaming mode of operation according to an embodiment of the invention. More specifically, FIG. 5A illustrates writing time (T0 to T1) from the host to the buffer memory 120 and scattering time (from T1) from the buffer memory 120 to the channels of the nonvolatile memories 170, 180, and 190.

First, the thirty-two sectors 200, 210, 220, and 230 must be written in the WBA 122 of the buffer memory 120 to write thirty-two sectors allocated to each channel in the nonvolatile memory device. Write instructions and write data are provided to the nonvolatile memories each corresponding to each of the channels when temporarily storing the thirty-two sectors 200, 210, 220, and 230 in the WBA 122 is completed. That is, the data starts to be transmitted to each channel by a unit of eight sectors stored in each of the segments 4, 5, 6, and 7 (Seg_4, Seg_5, Seg_6, and Seg_7). For example, the sector data 200 is transmitted to the first channel Ch.1, the sector data 210 is transmitted to the second channel Ch.2, the sector data 220 is transmitted to the third channel Ch.3, and the sector data 230 is transmitted to the fourth channel Ch.4. The data is not transmitted to each channel until completion of writing data of a specific unit (e.g., 32 sectors) into the WBA 122 of the buffer memory 120 to write the data without the streaming operation.

FIG. 5B is a timing diagram illustrating a write transaction performed during a streaming mode of operation according to an embodiment of the invention. Upon inputting write data to the buffer memory 120 from the host, the data is transmitted to the channel of the nonvolatile memory from the buffer memory 120. Sector data 250 are buffered to the area corresponding to the segment 4 (Seg_4) of the buffer memory 120 from the host. At timing t1, the buffered sector data 250 are sensed by the streaming control logic 141 at time t1 and the VBSC4 is counted up. When eight sector data 250 are all buffered to the area corresponding to the segment 4 (Seg_4), the VBSC4 may be set to 8. Subsequently, sector data 260, 270, and 280 may sequentially be recorded in the areas of the buffer memory 120 each corresponding to each of the allocated segment 5, 6, and 7 (Seg_5, Seg_6, and Seg_7). In addition, the VBSC5, VBSC6, and VBSC7 each corresponding to each of the segments may be counted up to 8. When the VBSC has a value of 1 or more, transmission of data to the corresponding channel is immediately activated by the streaming control logic 141. That is, the streaming control logic 141 immediately activates the transmission of data to the first channel Ch.1 when the VBSC is counted up to 1. A slight delay occurs from the timing t1 at which the VBSC4 is counted up to 1 to timing at which the transmission of the sector data 251 is started. Furthermore, it is assumed that write instructions to each of the channels are previously activated at a streaming operation mode. Therefore, the sector data 250 are buffered to the area corresponding to the segment 4 (Seg_4) starts to be transmitted to the first channel Ch.1 after timing t2. That is, each of the sector data 251, 252, 253, 254, . . . , and 258 may be programmed to the nonvolatile memory via the first channel Ch.1. The sector data 260 are buffered to the area corresponding to the segment 5 (Seg_5) starts to be transmitted to the second channel Ch.2 after timing t3. That is, each of the sector data 261, 262, 263, 264, . . . , and 268 may be programmed to the nonvolatile memory via the second channel Ch.2. The sector data 270 are buffered to the area corresponding to the segment 6 (Seg_6) starts to be transmitted to the third channel Ch.3 after timing t4. That is, each of the sector data 271, 272, 273, 274, . . . , and 278 may be programmed to the nonvolatile memory via the third channel Ch.3. The sector data 280 are buffered to the area corresponding to the segment 7 (Seg_7) starts to be transmitted to the fourth channel Ch.4 after timing t5. That is, each of the sector data 281, 282, 283, 284, . . . , and 288 may be programmed to the nonvolatile memory via the fourth channel Ch.4.

In the case where the streaming mode is used under the same looping count condition (looping count=8), the write data is ahead transmitted to the nonvolatile memory through at least channels Ch.1, Ch.2, and Ch.3 according to the embodiment of FIG. 5B, as compared to the embodiment of FIG. 5A. In the case where the streaming mode is not used, all the data will be transmitted after at least timing t5. The high-speed data transmission may be accomplished by means of the monitoring using the VBSC of the streaming controller 140, without intervention of firmware.

Figure 5C:
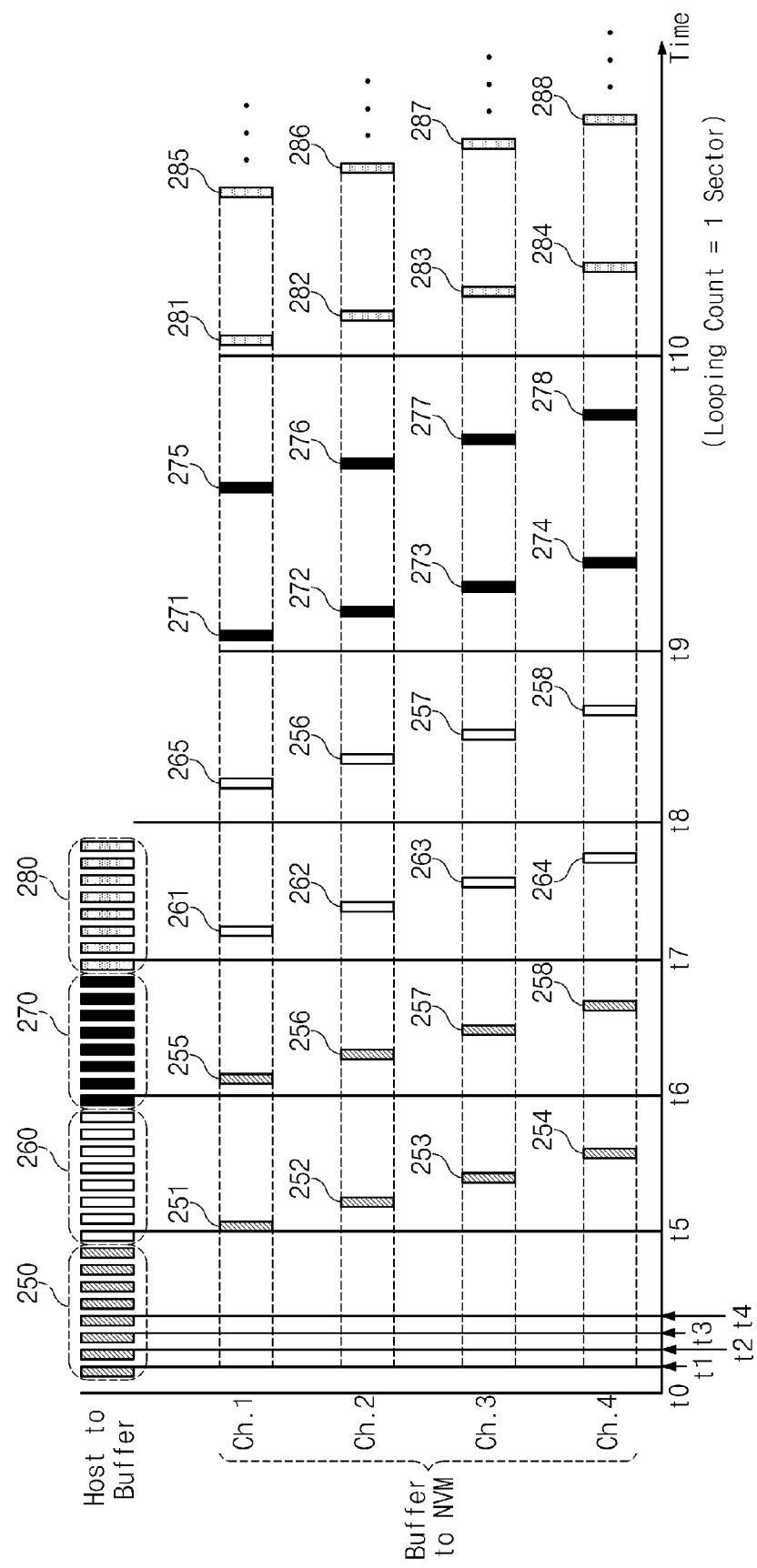
FIG. 5C is a timing diagram illustrating another write transaction performed during the streaming mode.

FIG. 5C is a timing diagram illustrating another write transaction performed during a streaming mode of operation according to an embodiment of the invention and further illustrates certain advantages provided by the streaming operation. A write transaction is started under an example where a value of looping count 148 of the register set 143 is set to one sector. Upon inputting the write data to the buffer memory 120 from the host, the data is transmitted to the channel of the nonvolatile memory from the buffer memory 120. Sector data 250 are buffered to the area corresponding to the segment 4 (Seg_4) of the buffer memory 120 from the host. At timing t1, the buffered sector data 250 are sensed by the streaming control logic 141 and the VBSC4 is counted up. However, since the value of the looping count 148 is set to one sector, the following input sector of the sector data 250 is buffered to the area corresponding to the segment 5 (Seg_5). The sequentially input sector data are buffered to the areas corresponding to the segment 6 and 7 (Seg_6 and Seg_7). Furthermore, the VBSC5, VBSC6, and VBSC7 each corresponding to each of the segment 5, 6, and 7 (Seg_5, Seg_6, and Seg_7) will be counted up by one, respectively. As a result, when the data are sequentially buffered to each of the segments at the timings t1, t2, t3, and t4, the buffered data will start to be transmitted to the channels each corresponding to each of the segments to be written in the nonvolatile memory. When eight sector data 250 are stored in the buffer memory by dividing them into two sectors per each segment, the stored sector data are transmitted to the nonvolatile memory between the time t5 and t7. Particularly, eight sector data are scattered and programmed to each of the channels through a channel transmission loop for transmitting two sectors (e.g., 251 and 255) to one channel. Each of the sector data 251, 252, 253, 254, . . . , 258 is scattered according to the channel transmission loop (Ch.1→Ch.2→Ch.3→Ch.4→Ch.1→Ch.2→Ch.3→Ch.4). In eight sector data 260 continuously transmitted from the host, each of sector data 261, 262, 263, 264, . . . , 268 is scattered according to the channel transmission loop (Ch.1→Ch.2→Ch.3→Ch.4→Ch.1→Ch.2→Ch.3→Ch.4). Each of sector data 271, 272, 273, 274, . . . , 278 of eight sector data 270 is scattered according to the channel transmission loop (Ch.1→Ch.2→Ch.3→Ch.4→Ch.1→Ch.2→Ch.3→Ch.4). Each of sector data 281, 282, 283, 284, . . . , 288 of eight sector data 280 is scattered according to the channel transmission loop (Ch.1→Ch.2→Ch.3→Ch.4→Ch.1→Ch.2→Ch.3→Ch.4).

According to the embodiment of FIG. 5C, when changing the looping count, it will be understood that the efficiency of the streaming mode operation may be further improved. When the value of looping count is set to 8 in FIG. 5B, the sector data 280 start to be transmitted to the channel Ch.4 in which the data transmission is conducted last, after being stored in the buffer memory 120. However, when the value of the looping count is set to 1, the data starts to be transmitted to the channel Ch.4 in which the data transmission is conducted last at the timing t4, before the transmission of sector data 250 is completed.

Referring to FIG. 5C, it will be understood that even when the streaming mode is used, the data transmission rate may be accelerated by properly setting the register set 143. While unit data to be transmitted is limited to a sector, embodiments of the invention are not limited thereto. That is, if the size of unit data can be subdivided into access units of the buffer memory 120, the data transmission may be performed at a higher speed.

Figure 6:
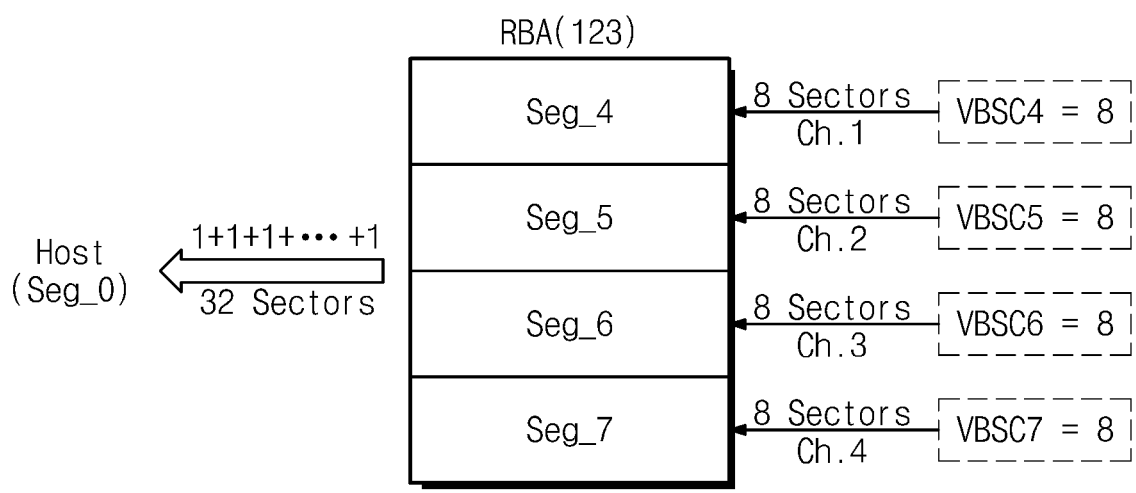
FIG. 6 is a block diagram illustrating an operation updating the value of a valid buffer sector counter VBSC with respect to a read buffer area within an embodiment of the invention.

FIG. 6 is a block diagram illustrating an update operation for the VBSC 142 during the read streaming operation. It is assumed that the read data are provided by eight sectors from each of the channels Ch.1, Ch.2, Ch.3, and Ch.4 to be transmitted to the host. Again, it is assumed that the read data is transferred to the host from the buffer memory 120 to describe a count method of the VBSC 142 after the buffering to the buffer memory 120 is completed. However, in practical cases, the read data will be immediately transferred to the host from the relevant segment when even one sector is input to the relevant segment of the buffer memory 120. This approach will now be described in some additional detail.

The buffer manager 130 stores sector data in the segment allocated to the RBA 123 of the buffer memory 120 when eight sectors are transmitted to the buffer memory 120 from each channels of the nonvolatile memories 170, 180, . . . , and 190. Segment allocation of the RBA 123 will be described herein. A segment to be allocated to the host is set to a segment 0 (Seg_0). The segment 4 (Seg_4) is allocated to the buffer area allocated to the data to be transmitted to the buffer memory from the nonvolatile memory corresponding to the first channel Ch.1. The segment 5 (Seg_5) is allocated to the buffer area allocated to the data to be transmitted to the buffer memory from the nonvolatile memory corresponding to the second channel Ch.2. The segment 6 (Seg_6) is allocated to the buffer area allocated to the data to be transmitted to the buffer memory from the nonvolatile memory corresponding to the third channel Ch.3. Furthermore, the segment 7 (Seg_7) is allocated to the buffer area allocated to the data to be transmitted to the buffer memory from the nonvolatile memory corresponding to the fourth channel Ch.4. At this time, the values of VBSC each corresponding to each segment of the RBA 123 are sequentially counted up, respectively when eight sectors are provided from each of the channels. When the BSS reaches 8 with sequential increase of the VBSC4 corresponding to the segment 4 (Seg_4), the following sectors to be input are stored in the segment 5 (Seg_5).

When the BSS reaches 8 with increase of the VBSC5 corresponding to the segment 5 (Seg_5), the following sectors to be input are stored in the segment 6 (Seg_6). When the BSS reaches 8 with sequential increase of the VBSC6 corresponding to the segment 6 (Seg_6), the following sectors are stored in the segment 7 (Seg_7). When the BSS reaches 8 with sequential increase of the VBSC7 corresponding to the segment 7 (Seg_7), the buffering and the count operation of the VBSC 142 are completed with respect to 32 sectors.

As noted above, the above-mentioned count (or update) operation for the VBSC 142 has been described under an assumption that the read data is not transferred from the buffer memory 120 to the host. However, in practical cases, the read data will be immediately transferred to the host when the value of VBSC corresponding to each of the segments is 1 or more.

FIG. 7A is a timing diagram illustrating a read operation performed during a non-streaming mode of operation according to an embodiment of the invention. More specifically, FIG. 7A illustrates timings (T0~T1) at which read data is written in the buffer memory 120. Also FIG. 7A illustrates data 310, 320, 330, and 340 to be transferred to the host from the buffer memory 120.

Writing thirty-two sectors 311~318, 321~328, 331~338, and 341~348 in the RBA 123 of the buffer memory 120 must be completed to transmit the read data provided from the channels Ch.1, Ch.2, Ch.3, and Ch.4 of the nonvolatile memory device without a streaming mode. When the buffering of 32 sectors 311~318, 321~328, 331~338, and 341~348 is completed from the nonvolatile memories to the RBA 123 at the timing T1, sectors stored in each of the allocated segment 4, 5, 6, and 7 (Seg_4, Seg_5, Seg_6, and Seg_7) are transmitted to the host. For example, the data stored in the segment 4 (Seg_4) is transmitted to the host after organizing sector data 310. The data stored in the segment 5 (Seg_5) is to be transmitted to the host as sector data 320, the data stored in the segment 6 (Seg_6) is to be transmitted to the host as sector data 330, and the data stored in the segment 7 (Seg_7) is to be transmitted to the host as sector data 340.

As illustrated, in order to read the data without the streaming operation, the data is not transmitted to the host until writing data of a specific unit (e.g., 32 sectors) is completed from the nonvolatile memory to the RBA 123 of the buffer memory 120.

Figure 7B:
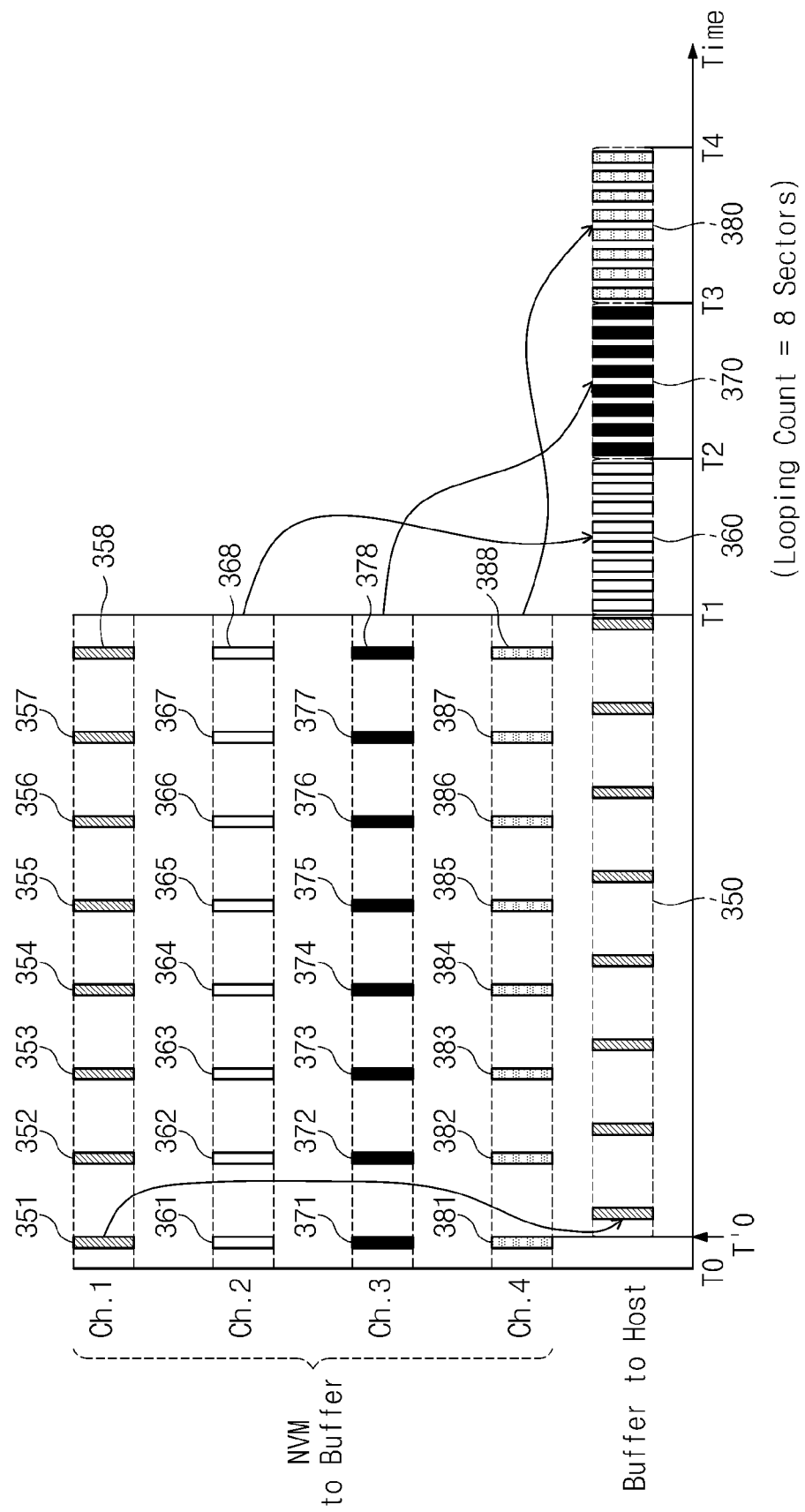
FIG. 7B is a timing diagram illustrating one read transaction performed during a streaming mode.

FIG. 7B is a timing diagram of a read operation performed during a streaming mode of operation according to an embodiment of the invention. More specifically, FIG. 7B illustrates timings (T0~T1) at which the read data are written from the channels Ch.1, Ch.2, Ch.3, and Ch.4 of the nonvolatile memories to the buffer memory 120. Also FIG. 7B illustrates eight sector data 350, 360, 370, and 380 to be transmitted to the host from the buffer memory 120. Note that is it assumed that the looping count is set to 8.

In response to activation of the streaming operation mode, read data 351~358, 361~368, 371~378, and 381~388 provided from respective channels of the non-volatile memory are written in the buffer memory 120. The data 351~358 read from the nonvolatile memory through the first channel Ch.1 are stored in the RBA 123 corresponding to the segment 4 (Seg_4). The data 361~368 read from the nonvolatile memory through the second channel Ch.2 are stored in the RBA 123 corresponding to the segment 5 (Seg_5). The data 371~378 read from the nonvolatile memory through the third channel Ch.3 are stored in the RBA 123 corresponding to the segment 6 (Seg_6). The data 381~388 are read from the nonvolatile memory through the fourth channel Ch.4 are stored in the RBA 123 corresponding to the segment 7 (Seg_7). Since the streaming operation is active, the VBSC4 is updated to a value larger than 1 from the moment that the sector 351~358 are stored in the RBA 123 of the segment 4 (Seg_4). Interfacing with the host is much faster than interfacing with the channel of the nonvolatile memory. Therefore, on writing one sector in the RBA 123 of the segment 4 (Seg_4), the sector may be transmitted to the host. In this case, the value of VBSC4 may repeat "0" and "1" for the timings T0~T1 at which the sector data 351 to 358 are stored in the RBA 123 of the segment 4 (Seg_4). However, values of VBSC5, VBSC6, and VBSC7 are counted up to 8, respectively. The VBSC5, VBSC6, and VBSC7 correspond to the segment 5, 6, and 7 (Seg_5, Seg_6, and Seg_7) corresponding to the second channel Ch.2, third channel Ch.3, and fourth channel Ch.4, respectively. Accordingly, similar to the sector data 350, the sector data 351~358 read from the first channel Ch.1 are first transmitted to the host at timing T'0. That is, the sector data 351~358 starts to be transmitted to the host from the moment that the data are written in the segment 4 (Seg_4). In addition, when transmitting the sector data 350 to the host is completed, data stored in the segments 5, 6, and 7 (Seg_5, Seg_6, and Seg_7) respectively corresponding to the second to fourth channels Ch.2, Ch.3, and Ch.4 are immediately transmitted to the host at an interface rate (e.g., SATA) of the host. That is, the sector data 360, 370, and 380 are transmitted to the host at a high speed.

As explained so far, read data begins transfer to the host according to activation of a streaming operation mode from the moment that the read data is stored in the buffer memory 120. Therefore, it is possible to provide a semiconductor disk device which provides a high response speed by using a streaming operation mode.

FIG. 7C is a timing diagram of another read operation performed during a streaming mode of operation according to an embodiment of the invention. Referring to FIG. 7C, started is an operation of writing the read data from the channels Ch1, Ch.2, Ch.3, and Ch.4 of the nonvolatile memories to the buffer memory 120 for buffering times T0~T2. Sector data 351'~388' transmitted to the host from the buffer memory 120 are briefly shown in FIG. 7C. It is assumed that the looping count is set to 1.

In response to activation of the streaming operation mode, read data provided from each channel of the nonvolatile memory is written in the buffer memory 120. The data 351~358 read from the nonvolatile memory through the first channel Ch.1 are stored in the RBA 123 corresponding to the segment 4 (Seg_4). The data 361~368 read from the nonvolatile memory through the second channel Ch.2 are stored in the RBA 123 corresponding to the segment 5 (Seg_5). The data 371~378 read from the nonvolatile memory through the third channel Ch.3 are stored in the RBA 123 corresponding to the segment 6 (Seg_6). The data 381~388 read from the nonvolatile memory through the fourth channel Ch.4 are stored in the RBA 123 corresponding to the segment 7 (Seg_7). Since the looping count is 1, the sectors 351, 361, 371, and 381 of the first, second, third, and fourth channels Ch.1, Ch.2, Ch.3, and Ch.4 may initially be written in the segment 4 (Seg_4). Then, the VBSC4 becomes 4, which means that transmitting the data to the host is activated. This results in activation of transmitting sectors 351', 361', 371', and 381' stored in the RBA 123 corresponding to the segment 4 (Seg_4) to the host. With respect to second sector data 352, 362, 372, and 382 of each channel stored in the RBA 123 of the buffer memory 120, their transmission to the host is identically performed to the above-described data transmission. With respect to third through eighth sector data 353 to 358, 363 to 368, 373 to 378, and 383 to 388, transmitting these four sector units (i.e., [353', 363', 373', and 383'], [354', 364', 374', and 384'], . . . , [358', 368', 378', and 388']) to the host is identically performed to the above-described data transmission. As compared to the times T0~T2 at which the data are stored from the nonvolatile memory to the buffer memory 120, it will be understood that only times T2~T3 are additionally required for transmitting four sectors 358', 368', 378', and 388' from the buffer memory 120 to the host.

As explained so far, it will be understood that the transmission rate to the host may be accelerated by changing the looping count during the activation of the streaming mode. Accordingly, streaming types may be controlled by setting the register set 143 for various purposes under various environments. Although transmitted data is limited to the sector, the present invention is not limited thereto. That is, if the size of unit data can be subdivided into access units of the buffer memory 120, the data transmission may be performed at a higher speed.

Figure 8:
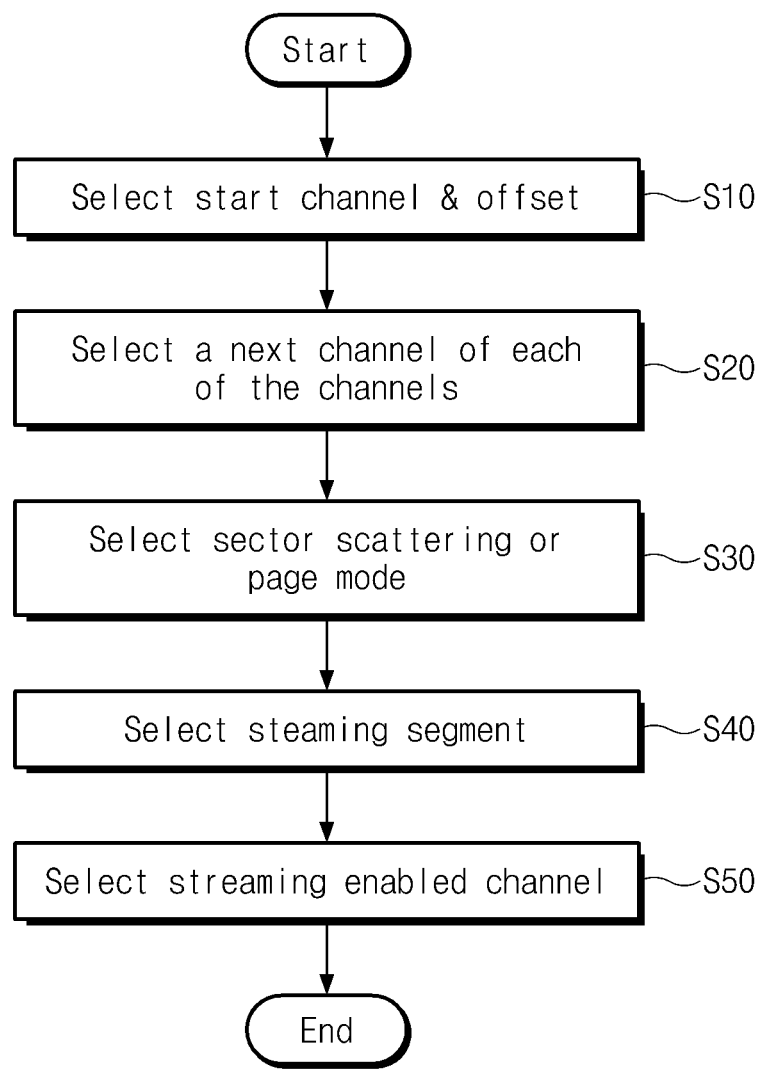
FIG. 8 is a flowchart summarizing set-up procedures to activate the streaming mode according to an embodiment of the invention.

FIG. 8 is a flowchart summarizing a method of setting-up the register set 143 to activate the streaming mode of operation according to an embodiment of the invention. Referring to FIG. 8, operating conditions and parameters selected or used during the streaming mode of operation may be applied according to illustrated procedures. These procedures will now be described with reference to the configuration of the register set 143 shown in FIG. 3.

A start channel and an offset value are set to start channel register 144 and the offset value register 145 respectively (S10). The start channel is initially selected during the streaming mode of operation, and the offset value is required for an address mapping of the nonvolatile memory device. Next channels for respective channels are set to the next channel register 146 during the streaming operation mode (S20). During the streaming mode of operation, a looping count is used to define units of the sectors scattered to the nonvolatile memory. The looping count and the page buffer size are set to a looping count register 148 and a page buffer size register 147 respectively (S30). The segments of the buffer memory 120 are allocated for use during streaming. In the above-described embodiment, four segments 4, 5, 6, and 7 (Seg_4, Seg_5, Seg_6, and Seg_7) are allocated to the RBA and the WBA, and the segment 0 (Seg_0) is allocated to the host. However, the illustrated embodiment is merely one fairly simple example used to explain the general concept of segment allocation (S40). A streaming channel register 149 is set to select and activate channels for the streaming. That is, it is possible to select nonvolatile memory channels through which data is written and read according to the streaming operation mode. The selected channels are input to the streaming channel register 149 such that among all the channels, only some channels operate in the streaming channel mode (S50).

Other operating conditions and parameters associated with the streaming mode of operation according to an embodiment of the invention may be set using the above-described setting procedure.

Figure 9:
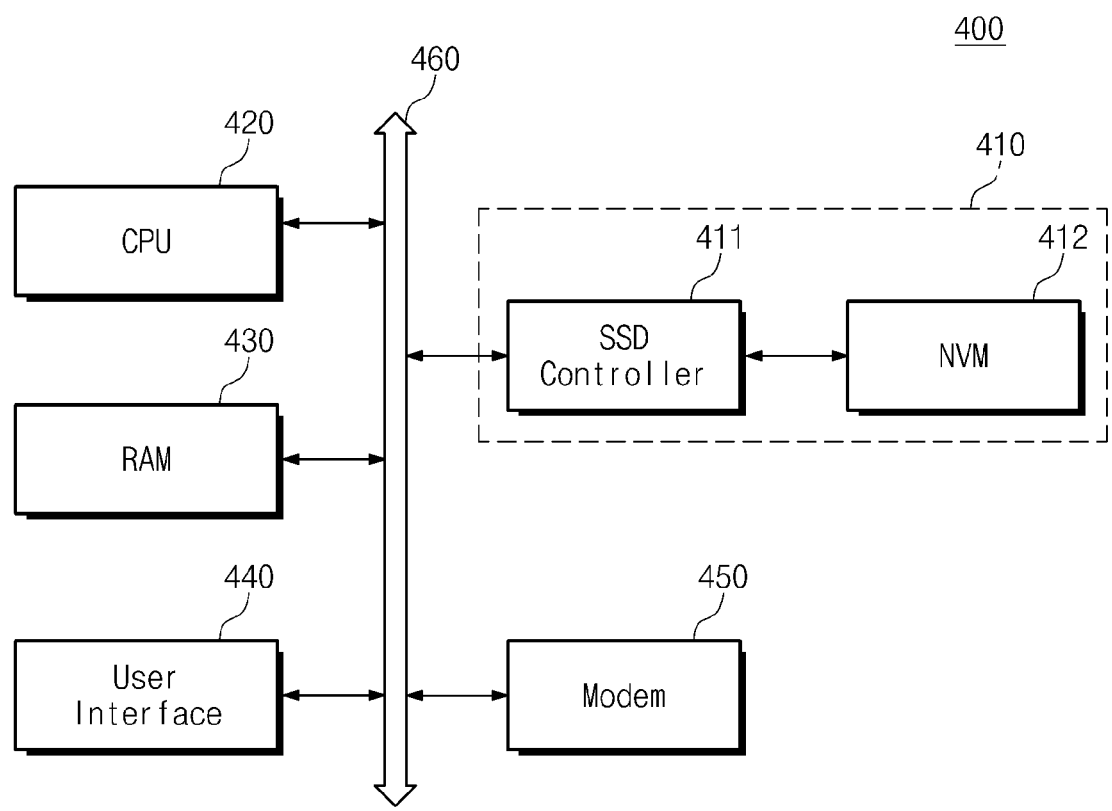
FIG. 9 is a block diagram illustrating a computational system incorporating a semiconductor disk device according to an embodiment of the invention.

FIG. 9 is a block diagram of a computational system 400 incorporating a semiconductor disk device or solid-state disk device (SSD) according to an embodiment of the invention. The computational system 400 generally includes a microprocessor 420, a random access memory (RAM) 430, a user interface 440, a modem 450 such as a baseband chipset, and an SSD 410, which are electrically connected to a system bus 460. The SSD 410 includes an SSD controller 411 and a nonvolatile memory (NVM) 412. The nonvolatile memory device 412 stores N-bit data (N being a positive integer) processed/to be processed by the microprocessor 420, through the SSD controller 411. In a case that the computing system according to the present invention is a mobile device, a battery (not shown) will additionally be provided to supply an operation voltage of the computing system. Although not illustrated in the drawings, it will be apparent to those skilled in the relevant art that the computing system 400 may be further provided with an application chipset, a camera image processor (CIS), a mobile DRAM, and so on. The computing system 400 may access to the SSD 410 at a high speed through the SSD 410. Even during a random access, high-speed data exchange may be accomplished through SSD 410 without intervention of firmware.

The SSD 410 may further be configured by an MMC card (Multimedia Card), an SD card (Secure Digital Card), a micro SD card, a memory stick, an ID card, a PCMCIA card, a chip card, a USB card, a smart card, a CF card (Compact Flash Card), and so on.

The nonvolatile memory device 412 can retain its stored data even when its power supply is interrupted. With the increase in use of mobile devices such as cellular phones, PDAs, digital cameras, portable game consoles, and MP3 players, the nonvolatile memory device 412 are being widely used as a code storage as well as a data storage. The SSD 410 including the nonvolatile memory device 412 and the SSD controller 411 may be used in home applications such as HDTV, DVD, router, and GPS.

The SSD 410 may be applied to an embedded system, which is a computing system embedded as a part of other components to perform only a specific computing work imposed on a device including oneself, unlike a typical computer. The embedded system has a central processing unit (CPU) and needs an operating system (OS). The embedded system executes an application under the OS to perform a specific work. Generally, the embedded system is provided to control military devices, industrial devices, communication devices, electric home appliances such as a set-top box, digital television set (DTV), and digital camera, and so on.

According to the present invention, the nonvolatile memory device and/or the SSD controller may be mounted by using various types of packages. For example, the nonvolatile memory device and/or the SSD controller may be mounted by using the packages such as a package on package (PoP), Ball grid arrays (BGAs), Chip Scale Packages (CSPs), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline Package (TSOP), Thin Quad Flatpack (TQFP), System In Package (SIP), Multi Chip Package (MCP), Wafer-level Fabricated Package (WFP), and Wafer-level Processed Stack Package (WSP).

While the present invention has been particularly shown and described with reference to exemplary embodiments thereof, it will be understood by those skilled in the art that various changes in form and details may be made therein without departing from the scope of the present invention as defined by the appended claims.

What is claimed is:

1. A solid-state disk device exchanging data with a host, comprising:
    a plurality of nonvolatile memory devices;
    a buffer memory configured to temporarily store data exchanged between the host and the plurality of nonvolatile memory devices and to transfer the stored data to the plurality of nonvolatile memory devices or the host using a streaming mode of operation or a non-streaming mode of operation; and a buffer manager configured to control transfer of data to and from the buffer memory in response to a read or write command from the host, wherein the transfer of data from the buffer memory to the plurality of nonvolatile memory devices or to the host during the streaming mode of operation begins upon determining that a first defined unit of data is stored in the buffer memory from the host or the plurality of nonvolatile memory devices in response to the read or write command, and the transfer of data from the buffer memory to the plurality of nonvolatile memory devices or to the host during the non-streaming mode of operation begins upon determining that a second defined unit of data larger than the first defined unit of data is stored in the buffer memory from the host or the plurality of nonvolatile memory devices in response to the read or write command, wherein the buffer memory is configured to exchange data with the plurality of nonvolatile memory devices via a plurality of channels, and wherein the buffer manager controls the transfer of data from the buffer memory to the plurality of nonvolatile memory devices according to a variable looping count value indicating a number of consecutive units of data in the buffer memory to be transmitted in succession through each of the plurality of channels.

2. The solid-state disk device of claim 1, wherein the buffer manager comprises a streaming controller configured to activate and control the streaming mode of operation.

3. The solid-state disk device of claim 2, wherein the streaming controller comprises:
a register set storing set-up information associated with the streaming mode of operation; and
a streaming control logic configured to control the streaming mode of operation with reference to the set-up information.

4. The solid-state disk device of claim 3, wherein the streaming control logic comprises a valid buffer sector counter configured to count a number of input/output unit data, and wherein the streaming control logic determines that the first defined unit of data is stored in the buffer memory based on a value of the valid buffer sector counter.

5. The solid-state disk device of claim 4, wherein the valid buffer sector counter is configured to count up the number of unit data when the unit data is input to the buffer memory, and counts down the number of unit data when the unit data is output from the buffer memory.

6. The solid-state disk device of claim 4, wherein the buffer memory is configured to exchange data with the plurality of nonvolatile memory devices via the plurality of channels according to a plurality of segments, each corresponding to one of the plurality of channels, and respectively allocated to the buffer memory.

7. The solid-state disk device of claim 6, wherein the valid buffer sector counter is further configured to count the number of unit data with respect to each of the segments.

8. The solid-state disk device of claim 7, wherein the streaming control logic is configured to control the buffer memory and the plurality of nonvolatile memory devices to begin transfer of the data to a corresponding channel or the host at a time when the number of unit data input/output to/from each of the segments is 1 or more.

9. The solid-state disk device of claim 6, wherein the register set comprises:
a start channel register indicating a channel through which the unit data is initially transmitted and received during the streaming mode;
a next channel register indicating sequence of the channels;
a looping count register indicating the variable looping count value; and
a streaming channel register selecting a channel to be driven according to the streaming mode from the channels.

10. The solid-state disk device of claim 9, wherein the register set further comprises:
an offset register providing an offset value of address according to designation of a start channel set by the start channel register.

11. The solid-state disk device of claim 1, wherein the first defined unit of data is data of sector unit.

12. The solid-state disk device of claim 1, wherein the first defined unit of data corresponds to a minimum access unit of the buffer memory.

13. A data processing method for a semiconductor disk device including a buffer memory and a plurality of nonvolatile memory devices exchanging data with the buffer memory via a plurality of channels, wherein the buffer memory is configured to store data received from the host or the plurality of nonvolatile memory devices in response to a read or write command from the host and to transfer the stored data to the plurality of nonvolatile memory devices or the host using a streaming mode of operation or a non-streaming mode of operation in response to the read or write command, the data processing method comprising:
counting a number of unit data input/output to/from each one of a plurality of segments allocated in the buffer memory so as to correspond to each one of the plurality of channels;
during the streaming mode of operation, in response to the write command transferring the data from the buffer memory to at least one of the plurality of nonvolatile memory devices via at least one of the plurality of channels upon determining that the number of unit data is 1 or more;
during the non-streaming mode of operation, in response to the write command transferring the data from the buffer memory to at least one of the plurality of nonvolatile memory devices via the plurality of channels upon determining that the number of unit data is at least a second value greater than one; and
controlling the transfer of data from the buffer memory to the at least one of the plurality of nonvolatile memory devices according to a variable looping count value indicating a number of consecutive units of data in the buffer memory to be transmitted in succession through each of the plurality of channels.

14. The data processing method of claim 13, wherein during counting of the number of unit data, the number of unit data input to the buffer memory is counted up, and the number of unit data output from the buffer memory is counted down.

15. The data processing method of claim 14, wherein an output from the buffer memory is disabled when the number of the counted unit data is 0.

16. The data processing method of claim 13, wherein the unit data corresponds to a sector unit or a minimum access unit of the buffer memory.

17. A data processing system, comprising:
a data storage device, and a host system exchanging data with the data storage device, wherein the data storage device is a solid-state disk device comprising:
a plurality of nonvolatile memory devices;
a buffer memory configured to temporarily store data exchanged between the host and the plurality of nonvolatile memory devices and to transfer the stored data to the plurality of nonvolatile memory devices or the host using a streaming mode of operation or a non-streaming mode of operation; and a buffer manager configured to control transfer of data to and from the buffer memory in response to a read or write command from the host, wherein the transfer of data from the buffer memory to the plurality of non-volatile memory devices or to the host during the streaming mode of operation begins upon determining that a first defined unit of data is stored in the buffer memory from the host or the plurality of non-volatile memory devices in response to the read or write command, and the transfer of data from the buffer memory to the plurality of nonvolatile memory devices or to the host during the non-streaming mode of operation begins upon determining that a second defined unit of data larger than the first defined unit of data is stored in the buffer memory from the host or the plurality of nonvolatile memory devices in response to the read or write command;

wherein the buffer memory is configured to exchange data with the plurality of nonvolatile memory devices via a plurality of channels, and wherein the buffer manager controls the transfer of data from the buffer memory to the plurality of nonvolatile memory devices according to a variable looping count value indicating a number of consecutive units of data in the buffer memory to be transmitted in succession through each of the plurality of channels.

18. The data processing system of claim 17, wherein the buffer manager comprises a streaming controller configured to activate and control the streaming mode of operation.

19. The data processing system of claim 18, wherein the streaming controller comprises:

a register set storing set-up information associated with the streaming mode of operation; and a streaming control logic configured to control the streaming mode of operation with reference to the set-up information.

20. The data processing system of claim 19, wherein the streaming control logic comprises a valid buffer sector counter configured to count a number of input/output unit data.

* * * * *